Figure 1:
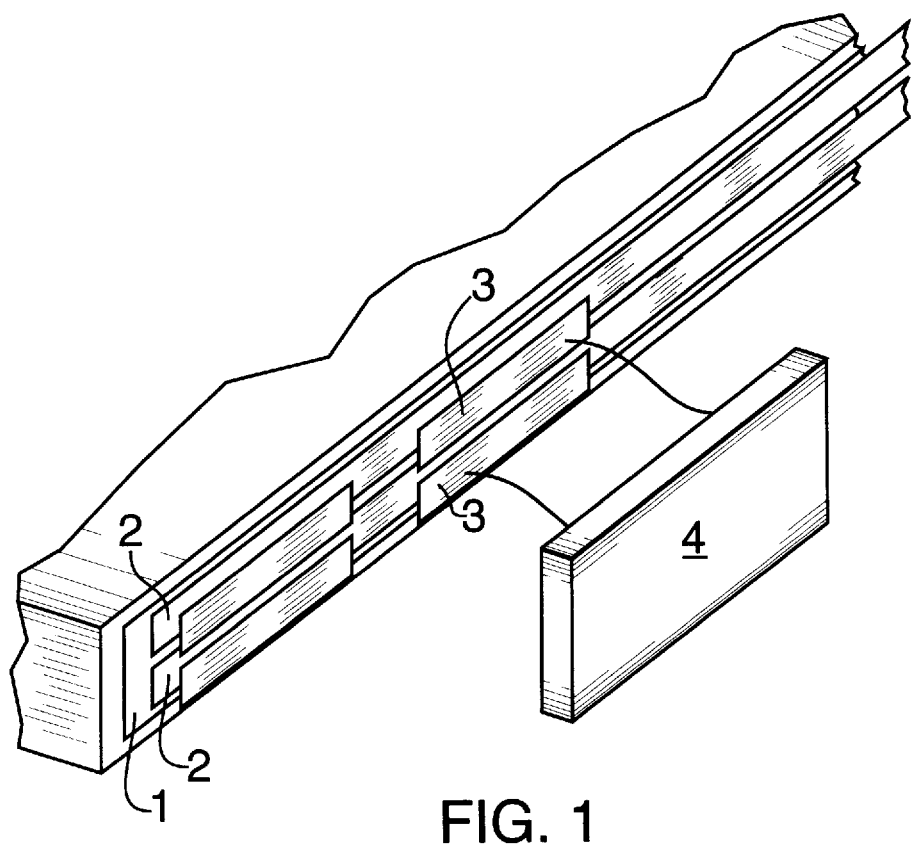

United States Patent [19]
Smith

[11] Patent Number: 5,870,067
[45] Date of Patent: Feb. 9, 1999

[54] CONTACTLESS DATA/POWER BUS

[75] Inventor: Michael Smith, Hertford, England

[73] Assignee: BSC Developments Ltd., England

[21] Appl. No.: 500,861

[22] PCT Filed: Dec. 14, 1994

[86] PCT No.: PCT/GB94/02746

§ 371 Date: Aug. 2, 1995

§ 102(e) Date: Aug. 2, 1995

[87] PCT Pub. No.: WO95/17051

PCT Pub. Date: Jun. 22, 1995

[30] Foreign Application Priority Data

Dec. 15, 1993 [GB] United Kingdom .................. 9325625

[51] Int. Cl.[6] .................................................. G09G 5/00
[52] U.S. Cl. ........................ 345/1; 345/2; 340/825.35; 235/383
[58] Field of Search ...................... 345/2, 1; 340/825.35; 235/383

[56] References Cited

U.S. PATENT DOCUMENTS

| | | |
|---|---|---|
| 4,002,886 | 1/1977 | Sundelin . |
| 4,390,877 | 6/1983 | Curran . |
| 4,500,880 | 2/1985 | Gomersall et al. ................. 340/825.35 |
| 4,674,235 | 6/1987 | Inoue ......................................... 451/28 |
| 4,766,295 | 8/1988 | Davis et al. . |
| 5,111,196 | 5/1992 | Hunt .................................. 340/825.35 |
| 5,198,644 | 3/1993 | Pfeiffer et al. .......................... 235/583 |
| 5,537,126 | 7/1996 | Kayser et al. ............................... 345/1 |
| 5,583,525 | 12/1996 | Nekomoto et al. .......................... 345/2 |

FOREIGN PATENT DOCUMENTS

| | | |
|---|---|---|
| 0468359 | 1/1992 | European Pat. Off. . |
| 2678403 | 12/1992 | France . |

*Primary Examiner*—Richard A. Hjerpe
*Assistant Examiner*—Francis Nghiem Nguyen
*Attorney, Agent, or Firm*—Bierman, Muserlian and Lucas

[57] ABSTRACT

An information system for a shelving system, such as in a supermarket, is disclosed. The system comprises a central data transmission source, a data distribution network, a common data link, and display units. The display units are capacitively coupled to conductive elements of the common data link.

14 Claims, 1 Drawing Sheet

CONTACTLESS DATA/POWER BUS

The present invention relates to electrical data and power transmission, and is particularly concerned to provide an improved method of distributing data or power or both to electronic shelf edge information display units as used, for example, in supermarkets.

There are a number of known methods that may be used to disseminate information from a central transmission source either directly to a plurality of such display units, or to a number of intermediate nodes that each control several slave shelf edge units. One of these methods is used in the system described by Sundelin in U.S. Pat. No. 4,002,886, where a number of parallel conductors are provided along the shelf edge and act as data bus lines to which the display units make direct electrical contact. Data is sent to the display units through the busses by a direct galvanic connection between the bus and the shelf edge display unit.

One practical disadvantage of galvanic connection systems is that the busses can easily become contaminated, and thus a good electrical connection may not be obtainable. Moreover, the process of retro-fitting an existing retail outlet with suitable shelf edge bus conductors is expensive in time and materials. Since most retail outlets presently have paper or card price labels carried on the shelf edges, there will already exist in most locations a perfectly good shelf edge carrier strip for paper display labels which would have to be discarded in favour of a new installation to carry the necessary bus wires. Such installations will be relatively expensive to manufacture and purchase, when compared to the simple paper carrier devices, due to their inherent complexity.

An objective of the present invention is to provide a contactless means of sending power and/or data to an electronic shelf edge display unit, and to provide a simple and low cost installation overcoming many of the drawbacks associated with the conventional arrangements. A further objective is to provide a means of adapting an existing shelf edge price labelling arrangement intended for paper or strip shaped pricing labels to accommodate electronic shelf edge display units.

According to a first aspect of the invention, an information display system for a retail outlet in which items placed on shelves are selected by a purchaser, and wherein information relating to the items is shown on electronic display screens incorporated in display units mounted along the edge of the shelf, the system comprising a central data transmission source providing addressed data messages to a data distribution network, and the data distribution network comprising a ribbon-like conductor extending along the edge of the shelf and insulated therefrom, and the display units each having a capacitor plate positioned in close non-contact relation to the ribbon-like conductor.

Preferably the system comprises a pair of parallel ribbon-like conductors extending along the shelf edge, each display unit having a corresponding pair of capacitor plates. It is also foreseen that three or more ribbon-like conductors may extend along the shelf edge, and each display unit may have a corresponding number of capacitor plates.

According to a second aspect of the invention, an existing shelf edge price display arrangement, wherein a carrier holds a strip of paper or the like which extends along the shelf edge, can be converted for use with electronic display units mounted on the shelf edge by means of a device comprising a ribbon of insulating material with conductive strips applied thereto and constructed so that it can easily be placed in or on the carrier. The ribbon may be placed in the carrier either instead of, or in addition to, the paper labels. The electronic display units are then mounted to the existing carrier in appropriate juxtaposition to the ribbon. Preferably, the presence of the conductive strips does not affect the existing shelf edge carrier or its conventional use for paper labels. Since it is possible to manufacture transparent conductors on transparent ribbon material, paper labels could be placed behind such a transparent ribbon and still be visible.

New installations would also benefit from this device since it clearly allows a mixture of traditional paper labelling and electronic labelling. The adapter now provides a communication path with the electronic labels using capacitive or inductive coupling, or by radio frequency.

Figure 2:
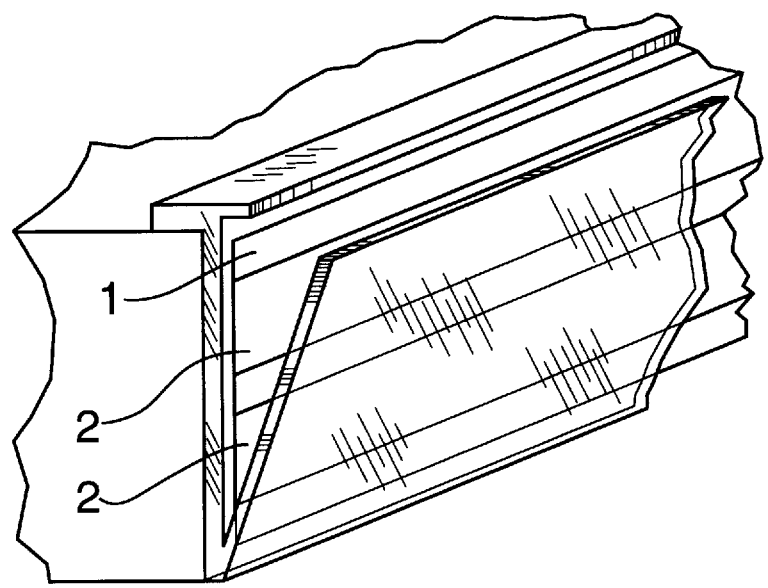

An example of a system according to the present invention will now be described with reference to the accompanying drawings, in which:

FIG. 1 is a schematic perspective view of a shelf with a ribbon-like conductor along its edge and display devices associated therewith; and FIG. 2 is a perspective view of a conventional carrier strip capable of accepting a paper label and/or a ribbon-like conductor strip.

In the embodiment shown in the Figures, the ribbon 1 includes two parallel flat conductors that act as capacitor plates 2, the other halves of the capacitors being formed by suitably sized plates 3 provided in an electronic display unit 4, as seen in FIG. 1. These plates 2, 3 are arranged to form the electrical circuit shown. By suitable electrical stimulation of the shelf edge plates 2, power and/or data may be transferred to the display unit plates 3, provided they are in close proximity. Clearly the form of the stimulation may be modulated in terms of frequency, amplitude or phase to carry said data.

The shelf edge capacitor plates 2 are preferably formed by a film of a conductive material applied to a thin substrate of an insulating material. Suitable insulating materials include synthetic plastics materials, as well as the traditional paper-like materials. An effective and low cost means of applying the conductive element forming the plates or plates 2 is to use printing techniques with conductive ink.

A conventional paper shelf edge label, on which price information can be written or printed, is about 30 mm by 70 mm. Such a label could be replaced by a ribbon conductor approximately 30 mm wide extending along the shelf edge in the carrier originally installed to carry the conventional labels. The ribbon conductor is wide enough to support two plates 2 of 12 mm width, spaced by 2 mm from each other and from the edges of the ribbon. By providing capacitor plates 3 on the display unit which are 12 mm wide and 70 mm long, and using an air gap of 1.5 mm between the plates 2 and 3, then a capacitance of about 20 pF would exist across the plates. There are thus two capacitors effectively in series in the circuit giving a usable capacitance of 10 pF. If the stimulation frequency were set at 32 kHz then the capacitive reactance would be about 0.5 MOhm allowing at least 6 uAmps to flow given a 3 Volts rms amplitude input. This approximate calculation shows that it is possible to also pass power to a display device provided that it incorporates low power electronics, CMOS and LCD technology for example.

Since the capacitive coupling is loose, the quantity of power that can be transferred is limited so that if the display device requires a lot of energy it must be self powered and the primary function of the plates 2 and 3 is to serve as a data channel only.

A beneficial arrangement of a complete system would be to have the display units designed as slave devices to a master device that manages the whole shelf edge. The master device would be responsible for handling communications with the main system controller and could employ any of the extant techniques for this purpose. Information would be relayed to the slave units by use of the contactless bus. The bus could also provide a path for the slave devices to suitably acknowledge the receipt of messages back to the master. In essence a two way communications channel from slave to master will be effected.

There are numerous existing designs of paper-carrying shelf edge label carriers, and thus the ribbon conductor would have to be designed to suit in each particular case. In the instance where the carrier is an integral part of the shelving metal work, the ribbon conductor could be applied in a self-adhesive form. This technique would also be employed where there is no special adaptation of the shelf edge to take a paper label and where the labels are placed into individual plastic mouldings that simply clip to the shelf facing edge.

I claim:

1. An information display system for a shelving system comprising at least one shelf, having an edge, on which items are placed for selection therefrom, the shelves having an existing mount for receiving conventional paper information display labels running along a portion thereof, the system comprising a central data transmission source, a data distribution network, and a common data link;

the data transmission source providing addressed data messages to the data distribution network;

the data distribution network comprising a number of information display units having electronic display screens for displaying information relating to the items on the shelves, the information display units being supplied with the addressed data messages via the common data link;

the common data link consisting essentially of a ribbon comprising a conductive element on a thin, flexible, insulating substrate, the ribbon being receivable in the said mount for receiving conventional paper information display labels; and the display units each having an electrically conductive plate connected thereto, and positioned in close proximity to, but not in contact with, the conductive element to thereby form a capacitive element.

2. An information display system according to claim 1, wherein the conductive element is a strip of electrically conductive material extending longitudinally along the substrate.

3. An information display system according to claim 2, wherein the substrate supports two or more conductive elements in a parallel array.

4. An information display system for a shelving system comprising at least one shelf, having an edge, on which items are placed for selection therefrom, the system comprising a central data transmission source, a data distribution network, and a common data link;

the data transmission source providing addressed data messages to the data distribution network;

the data distribution network comprising a number of information display units having electronic display screens for displaying information relating to the items on the shelves, the information display units being supplied with the addressed data messages via the common data link;

the common data link consisting essentially of a ribbon comprising a conductive element on a thin, flexible, insulating substrate, the ribbon being mounted directly onto the shelf edge; and the display units each having a capacitor plate electrically connected thereto, and positioned in close, but non-contact relation to the conductive element.

5. An information display system according to claim 4, wherein the conductive element is a strip of electrically conducting material extending longitudinally along the substrate.

6. An information display system according to claim 4, wherein the substrate is mounted on the edge of the shelf in addition to the conventional paper information display labels.

7. An information display system according to claim 4, wherein the ribbon is self-adhesively mounted to the edge of the shelf.

8. An information display system according to claim 4, wherein the strip is made from electrically conductive ink.

9. A method of converting a conventional display for a shelf, having an edge, and a mount mounted on the shelf for holding a number of conventional paper information display labels, to accept electronic information display units having a conductive plate electrically connected thereto, by applying a thin, flexible ribbon comprising a conductive element on a thin, flexible, insulating substrate to the mount, the ribbon being of a width similar to that of the labels, and subsequently fixing a number of the said electronic information display units so that the conductive plate is in non-contact capacitive connection with the conductive element.

10. An information display system according to claim 1, wherein the conductive element is made from electrically conductive ink.

11. An information display system according to claim 1, wherein the ribbon is mounted in the existing mount.

12. An information display system according to claim 1, wherein the substrate is mounted in the mount in addition to the conventional paper information display labels.

13. An information display system according to claim 1, wherein the substrate and the conductive element are made from transparent materials.

14. A method of converting a conventional display for a shelf, having an edge, to accept electronic information display units having a conductive plate electrically connected thereto, by applying a thin, flexible ribbon comprising a conductive element on a thin, flexible, insulating substrate to the edge of the shelf, and, subsequently fixing a number of the said electronic information display units so that the conductive plate is in non-contact capacitive connection with the conductive element.

* * * * *